United States Patent
Hirakami et al.

(10) Patent No.: US 10,156,001 B2
(45) Date of Patent: Dec. 18, 2018

(54) FILAMENT FOR HIGH STRENGTH STEEL CORD

(71) Applicant: NIPPON STEEL & SUMITOMO METAL CORPORATION, Tokyo (JP)

(72) Inventors: Daisuke Hirakami, Kisarazu (JP); Makoto Okonogi, Chiba (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 246 days.

(21) Appl. No.: 15/305,522

(22) PCT Filed: Apr. 23, 2015

(86) PCT No.: PCT/JP2015/062377
§ 371 (c)(1),
(2) Date: Oct. 20, 2016

(87) PCT Pub. No.: WO2015/163409
PCT Pub. Date: Oct. 29, 2015

(65) Prior Publication Data
US 2017/0044642 A1    Feb. 16, 2017

(30) Foreign Application Priority Data

Apr. 24, 2014 (JP) ................. 2014-090604

(51) Int. Cl.
*C22C 38/02* (2006.01)
*C22C 38/04* (2006.01)
(Continued)

(52) U.S. Cl.
CPC ............ *C21D 9/525* (2013.01); *B60C 9/0007* (2013.01); *C21D 8/06* (2013.01); *C21D 8/065* (2013.01);
(Continued)

(58) Field of Classification Search
None
See application file for complete search history.

(56) References Cited

U.S. PATENT DOCUMENTS

2011/0168302 A1    7/2011    Takahashi et al.
2012/0014831 A1    1/2012    Yamasaki et al.

FOREIGN PATENT DOCUMENTS

| CN | 1341155 A | 3/2002 |
|---|---|---|
| CN | 102066599 A | 5/2011 |

(Continued)

OTHER PUBLICATIONS

Korean Notice of Allowance, dated Mar. 21, 2018, for corresponding Korean Application No. 10-2016-7029255, with an English translation.

(Continued)

*Primary Examiner* — Deborah Yee
(74) *Attorney, Agent, or Firm* — Birch, Stewart, Kolasch & Birch, LLP

(57) ABSTRACT

A filament for a high strength steel cord has a wire diameter R of 0.1 mm to 0.4 mm, and includes, in a chemical composition, by mass %: C: 0.70% to 1.20%; Si: 0.15% to 0.60%; Mn: 0.10% to 1.00%; N: 0.0010% to 0.0050%; Al: more than 0% and 0.0100% or less; and a remainder of Fe and impurities, in which a surface part and a central part are included, a thickness of the surface part is 0.01×R to 0.10×R, the central part includes a pearlite structure in a proportion of 95% to 100% by area %, a C content of the surface part is 40% to 95% of a C content of the central part, and a ratio of a thickness of a lamellar cementite at a center of the thickness of the surface part to a thickness of a lamellar cementite in the central part is 95% or less, whereby high (Continued)

strength and workability can be achieved and cracking or the like caused by a delamination phenomenon can be prevented.

2 Claims, 4 Drawing Sheets

(51) Int. Cl.

| | |
|---|---|
| *C22C 38/06* | (2006.01) |
| *C21D 9/52* | (2006.01) |
| *B60C 9/00* | (2006.01) |
| *C21D 8/06* | (2006.01) |
| *C22C 38/00* | (2006.01) |
| *C22C 38/32* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/30* | (2006.01) |
| *C23C 30/00* | (2006.01) |
| *C23G 1/00* | (2006.01) |

(52) U.S. Cl.
CPC .............. *C21D 9/52* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C23C 30/005* (2013.01); *C23G 1/00* (2013.01); *C21D 2211/003* (2013.01)

(56) References Cited

FOREIGN PATENT DOCUMENTS

| | | |
|---|---|---|
| EP | 0233659 A1 | 8/1987 |
| EP | 3 015 563 A1 | 5/2016 |
| EP | 3135786 A1 | 3/2017 |
| JP | 6-136484 A | 5/1994 |
| JP | 2000-119805 A | 4/2000 |
| JP | 2001-181793 A | 7/2001 |
| JP | 2003-334606 A | 11/2003 |
| JP | 2004-91912 A | 3/2004 |
| JP | 2005-36356 A | 2/2005 |
| JP | 2005-54260 A | 3/2005 |
| JP | 2007-131945 A | 5/2007 |
| JP | 2010-270391 A | 12/2010 |
| JP | 2011-219829 A | 11/2011 |
| JP | 2012-126954 A | 7/2012 |
| KR | 10-2011-0020256 A | 3/2011 |
| KR | 10-2013-0034029 A | 4/2013 |
| KR | 10-2014-0009883 A | 1/2014 |
| WO | WO 2011-089782 A1 | 7/2011 |
| WO | WO 2014-208492 A1 | 12/2014 |
| WO | WO 2015/163407 A1 | 10/2015 |

OTHER PUBLICATIONS

International Search Report for PCT/JP2015/062377 dated Jun. 2, 2015.
Written Opinion of the International Searching Authority for PCT/JP2015/062377 (PCT/ISA/237) dated Jun. 2, 2015.
Chinese Office Action dated Jun. 19, 2017 for Chinese Patent Application 201580020664.7 with English translation.
Japanese Office Action dated Jun. 27, 2017 for Japanese Patent application 2016-515199 with English translation.
Extended European Search Report for European Application No. 15782916.9, dated Dec. 15, 2017.

FILAMENT FOR HIGH STRENGTH STEEL CORD

TECHNICAL FIELD OF THE INVENTION

The present invention relates to a filament for a high strength steel cord, which is used as a reinforcing material of a rubber product such as a tire for a vehicle, a high pressure rubber hose, or a conveyor belt.

Priority is claimed on Japanese Patent Application No. 2014-090604, filed on Apr. 24, 2014, the content of which is incorporated herein by reference.

RELATED ART

For example, for a rubber product such as a tire for a vehicle; chemical fibers made of rayon, nylon, polyester, or the like; or steel cords produced from filaments produced from a wire rod may be used as a reinforcing material. Such a reinforcing material is used for the frame of a tire for a vehicle and has a significant effect on the fuel efficiency, high speed durability, and steering stability of the vehicle in which the tire for a vehicle is mounted. In recent years, from the viewpoint of improving these characteristics, the frequency of use of steel cords as the reinforcing material has increased.

Here, for example, as disclosed in Patent Documents 6 and 7, a steel cord having a twisted structure made by twisting a plurality of steel wires (hereinafter, referred to as "filaments") has been widely proposed.

The steel cord using these filaments is produced through the following process.

First, dry drawing is performed on a wire rod having a wire diameter of 3.5 mm to 8.0 mm to produce a steel wire having a wire diameter of about 1.0 mm to 4.0 mm, and a heat treatment called a patenting treatment is performed on the steel wire to soften the steel wire.

Next, a brass plating is formed on the surface of the softened steel wire to ensure the adhesion between rubber and the steel cord, and the resultant is subjected to wet drawing (finish drawing), thereby forming filaments having a wire diameter of 0.15 mm to 0.35 mm.

The filaments obtained as described above are twisted to produce a steel cord having a twisted structure.

In recent years, from the viewpoint of a reduction in environmental load, tires for vehicles have been reduced in weight in order to promote fuel economy in vehicles, and high-strengthening is required in the steel cord. Therefore, high-strengthening is required in the filament for the steel cord as a material.

In order to form a high strength steel cord, high-strengthening is necessary after the patenting treatment, and high-strengthening is achieved through composition adjustment, such as increasing the C content.

However, when high-strengthening is performed only through composition adjustment by increasing the C content, the ductility is insufficient during drawing after patenting, and thus workability deteriorates. Therefore, during wet drawing (finish drawing) and twisting, defects such as cracks are generated.

Patent Document 1 discloses, for the purpose of inexpensively providing a high carbon steel wire rod having excellent drawability, in which wire breaking does not occur even when drawing is performed with a true strain amount of more than 2.60, and which is thus appropriate for use in a steel cord or the like, a wire rod in which the average value of C content in a region from the outer circumference to a position at a depth of $\frac{1}{50}$ of the radius of the steel wire rod in a transverse section of a steel wire rod is 0.6×C % to 0.9×C % of the C content of the wire rod.

Patent Document 2 discloses, for the purpose of providing a wire rod which is less likely to cause wire breaking caused by flaws due to handling or the like during transportation, a high strength directly patented wire rod having a diameter of 4.0 mm to 16 mm, in which the carbon content of a layer at a depth of 300 μm from the surface layer is 0.97 times or less of the average carbon content of the entire cross section, and the surface layer having an average lamellar spacing of 95 nm or more in the above-mentioned layer is the layer where chafing martensite is less likely to be formed.

Patent Document 3 discloses, for the purpose of providing a wire rod which has excellent cold workability and is thus appropriate as a production material of a steel cord or the like, a wire rod in which the size of pearlite blocks is controlled to be austenite grain size numbers 6 to 8 in the steel, the amount of generated proeutectoid cementite is controlled to be 0.2% or less by volume fraction, the thickness of cementite in pearlite is controlled to be 20 nm or less, and the Cr content of the cementite is controlled to be 1.5% or less.

Patent Document 4 discloses a high carbon steel wire rod for drawing, in which, when the diameter of the high carbon steel wire rod is referred to as D, a region ranging from the surface of the high carbon steel wire rod to a depth of 0.05 D or less is referred to as a surface part, a region deeper than 0.20 D from the surface is referred to as an inside part, 90% or more of the structure of the surface part is a coarse lamellar pearlite structure having a lamellar spacing of 0.10 μm or more, and 95% or more of the structure of the inside part is a fine pearlite structure or a degenerate-pearlite structure having a lamellar spacing of less than 0.10 μm.

Patent Document 5 discloses a high carbon steel wire rod in which the area fraction of pearlite in a cross-section perpendicular to a longitudinal direction is 95% or more, the remainder therein has a non-pearlite structure including one or more of bainite, degenerate-pearlite, proeutectoid ferrite, and proeutectoid cementite, the average block grain size of pearlite is 15 μm to 35 μm, the area fraction of pearlite having a block grain size of 50 μm or more is 20% or less, and a region having a lamellar spacing of 150 nm or less in the pearlite is 20% or less in a region ranging from the surface to a depth of 1 mm.

PRIOR ART DOCUMENT

Patent Document

[Patent Document 1] Japanese Unexamined Patent Application, First Publication No. 2000-119805
[Patent Document 2] Japanese Unexamined Patent Application, First Publication No. 2001-181793
[Patent Document 3] Japanese Unexamined Patent Application, First Publication No. 2004-091912
[Patent Document 4] Japanese Unexamined Patent Application, First Publication No. 2011-219829
[Patent Document 5] PCT International Publication No. WO2014/208492 [Patent Document 6] Japanese Unexamined Patent Application, First Publication No. 2005-054260
[Patent Document 7] Japanese Unexamined Patent Application, First Publication No. 2005-036356

DISCLOSURE OF THE INVENTION

Problems to be Solved by the Invention

However, the filament produced from the wire rod disclosed in Patent Documents 1 to 5 and the filament disclosed in Patent Documents 6 and 7 have a problem in that a delamination phenomenon occurs.

A delamination phenomenon is a phenomenon in which longitudinal cracks that cause cracking in a longitudinal direction are generated when a filament is twisted and deformed, and easily occurs when the strength of the filament increases.

Particularly, when the strength thereof increases, a twisting defect caused by the delamination phenomenon occurs, and the twisting cannot be properly performed.

As described above, in the related art, a filament for a steel cord in which cracking or the like caused by the delamination phenomenon can be prevented while high strength and workability are maintained after the finish drawing process cannot be obtained.

An object of the present invention is to provide a filament for a steel cord in which cracking or the like caused by a delamination phenomenon can be prevented while high strength and workability are maintained after a finish drawing process.

Means for Solving the Problem

The inventors conducted intensive research and development, and as a result, discovered the following. That is, when a filament for a steel cord has the following chemical composition and has a surface part and a central part, and the surface part has a lower C content and a thinner lamellar cementite than those of the central part, cracks in cementite that become an origin of wire breaking become finer, and the ductility of the surface part can be significantly improved while ensuring the strength of the central part.

The present invention has been made on the basis of the above-described knowledge, and the gist is as follows.

(1) According to a first aspect of the present invention, there is provided a filament for a high strength steel cord, which has a wire diameter R of 0.1 mm to 0.4 mm and includes, in a chemical composition, by mass %: C: 0.70% to 1.20%; Si: 0.15% to 0.60%; Mn: 0.10% to 1.00%; N: 0.0010% to 0.0050%; Al: more than 0% and 0.0100% or less; and a remainder of Fe and impurities, in which a surface part and a central part are included, the surface part covers the central part, a thickness of the surface part is 0.01×R to 0.10×R, the central part includes a pearlite structure in a proportion of 95% to 100% by area %, a C content of the surface part is 40% to 95% of a C content of the central part, and a ratio of a thickness of lamellar cementite at the center of the thickness of the surface part to a thickness of lamellar cementite in the central part is 95% or less.

(2) In the aspect of (1), the filament may further include, in the chemical composition, by mass %, one or two or more of Ti: more than 0% and 0.1000% or less, Cr: more than 0% and 0.5000% or less, Co: more than 0% and 0.5000% or less, V: more than 0% and 0.5000% or less, Cu: more than 0% and 0.2000% or less, Nb: more than 0% and 0.1000% or less, Mo: more than 0% and 0.2000% or less, W: more than 0% and 0.200% or less, B: more than 0% and 0.0030% or less, REM: more than 0% and 0.0050% or less, Ca: more than 0.0005% and 0.0050% or less, Mg: more than 0.0005% and 0.0050% or less, and Zr: more than 0.0005% and 0.0100% or less.

Effects of the Invention

In the filament for a high strength steel cord according to the aspect of the present invention, the ductility of the surface part is improved and the strength of the central part is ensured, therefore, a significant effect of suppressing the occurrence of a delamination phenomenon, preventing the occurrence of a twisting defect, and achieving a tensile strength of 3200 MPa or more can be exhibited.

EMBODIMENTS OF THE INVENTION

In an embodiment of the present invention, there is provided a filament for a high strength steel cord described in the following (A) or (B).

(A) A first aspect of the present invention is a filament for a high strength steel cord, which has a wire diameter R of 0.1 mm to 0.4 mm and includes, in a chemical composition, by mass %: C: 0.70% to 1.20%; Si: 0.15% to 0.60%; Mn: 0.10% to 1.00%; N: 0.0010% to 0.0050%; Al: more than 0% and 0.0100% or less; and a remainder of Fe and impurities, in which a surface part and a central part are included, the surface part covers the central part, a thickness of the surface part is 0.01×R to 0.10×R, the central part includes a pearlite structure in a proportion of 95% to 100% by area %, a C content of the surface part is 40% to 95% of a C content of the central part, and a ratio of a thickness of lamellar cementite at the center of the thickness of the surface part to a thickness of lamellar cementite in the central part is 95% or less.

(B) In the aspect of (A) described above, the filament may further include, in the chemical composition, by mass %, one or two or more of Ti: more than 0% and 0.1000% or less, Cr: more than 0% and 0.5000% or less, Co: more than 0% and 0.5000% or less, V: more than 0% and 0.5000% or less, Cu: more than 0% and 0.2000% or less, Nb: more than 0% and 0.1000% or less, Mo: more than 0% and 0.2000% or less, W: more than 0% and 0.200% or less, B: more than 0% and 0.0030% or less, REM: more than 0% and 0.0050% or less, Ca: more than 0.0005% and 0.0050% or less, Mg: more than 0.0005% and 0.0050% or less, and Zr: more than 0.0005% and 0.0100% or less.

<Properties of Metallographic Structure>

The properties of the metallographic structure of the filament for a high strength steel cord in the embodiment will be described with reference to FIG. 1.

In a filament 20 for a high strength steel cord in the embodiment of the present invention, a wire diameter R as its diameter (hereinafter, referred to as a "wire diameter") R satisfies $$0.10 \text{ mm} \leq R \leq 0.40 \text{ mm} \quad \text{(Expression 1)}$$

and a surface part 21 and a central part 22 are included. Preferably, $$0.15 \text{ mm} \leq R \leq 0.35 \text{ mm} \quad \text{(Expression 2)}$$

is satisfied.

(Surface Part)

Figure 1:
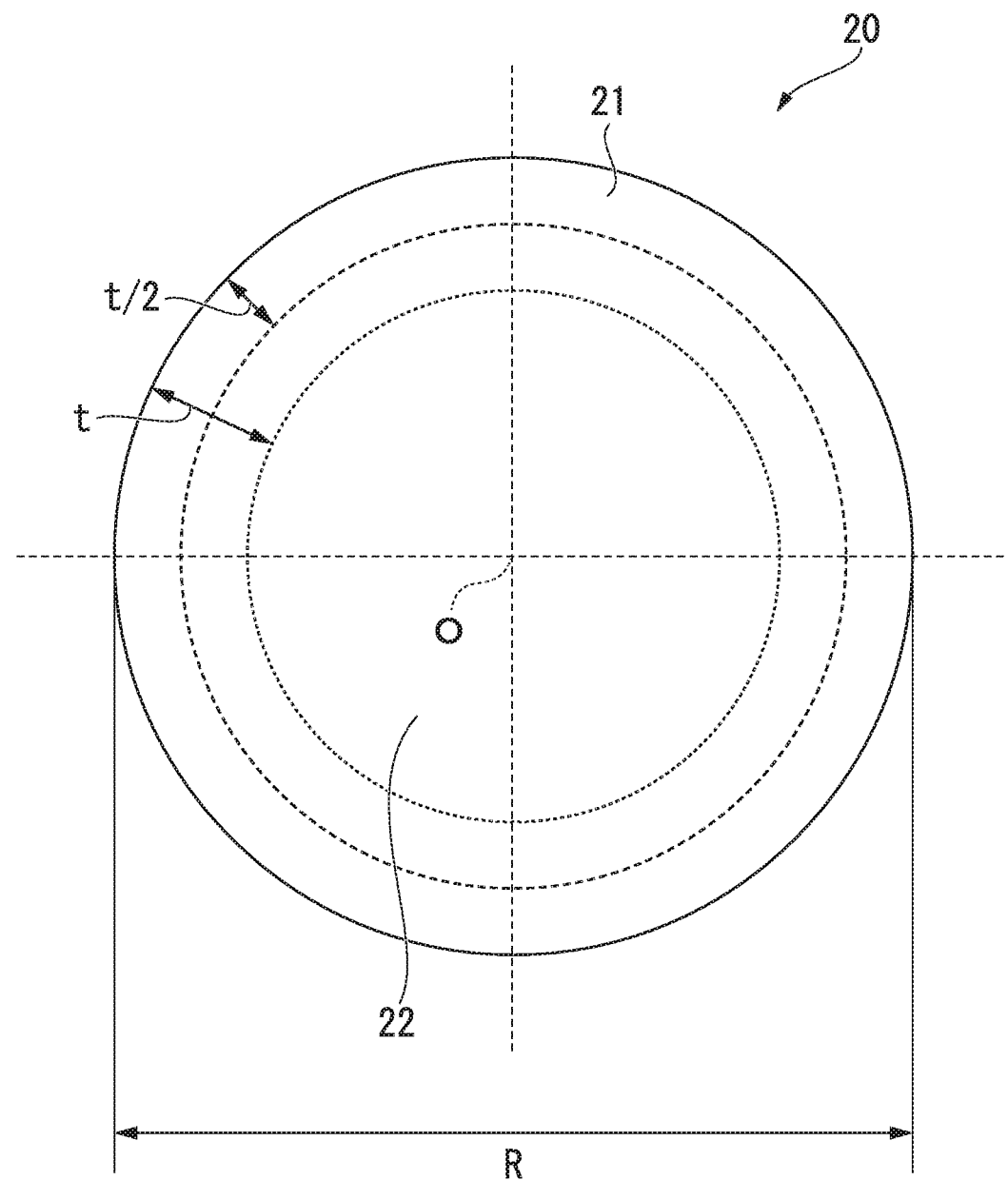
FIG. 1 is a cross-sectional explanatory view of a filament for a high strength steel cord in an embodiment of the present invention.

As illustrated in FIG. 1, the surface part 21 is a part having a thickness t from the outer circumferential surface of the filament 20 for a high strength steel cord. In addition, the thickness (hereinafter, referred to as the "thickness of the surface part") t of the surface part 21 is a region in a range of $$0.01 \times R \leq t \leq 0.10 \times R \quad \text{(Expression 3)}$$

with respect to the wire diameter R of the filament 20 for a high strength steel cord. Preferably, $$0.03 \times R \leq t \leq 0.07 \times R \quad \text{(Expression 4)}$$

is satisfied.

The surface part 21 has a lower C content than that of the central part 22 and has a C content of 40% to 95% of the C content of the central part 22 of the filament 20 for a high strength steel cord.

The reason that the thickness t of the surface part is set to 0.01×R to 0.10×R of the wire diameter R will be described.

First, when the thickness t of the surface part is set to 0.01×R to 0.10×R, workability can be sufficiently ensured, and the generation of defects such as cracks during finish drawing and twisting can be suppressed.

Second, when the thickness t of the surface part is set to 0.10×R or less, the strength of the steel cord can be sufficiently ensured.

Next, a position at a depth of t/2 from the outer circumferential surface, which is indicated by a dotted line in FIG. 1 is defined as the center of the thickness of the surface part (hereinafter, referred to as the "center of the surface part").

The thickness of lamellar cementite at the center of the surface part is 95% or less of the thickness of lamellar cementite in the central part 22, which will be described later.

(Central Part)

The central part 22 includes the center O of the filament 20 for a high strength steel cord and is a part excluding the surface part.

The central part 22 has a substantially constant C content and is a region having a metallographic structure including a pearlite structure in a proportion of 95% to 100% by area %.

Accordingly, the strength of the central part 22 is sufficiently ensured, and it becomes possible to achieve a reduction in the weight of the steel cord.

(Measurement of Thickness of Lamellar Cementite)

Regarding the thickness of lamellar cementite, four points at every central angle of 90° in the cross section of a filament at the same depth from the surface layer were photographed with a TEM at a magnification of 500,000-fold, the thickness of lamellar cementite was obtained in each visual field from lamellar cementite perpendicularly intersecting a line segment of 100 nm in the minimum lamellar spacing part of the observation photograph, and the average value of the four points was determined.

In addition, the ratio (%) of the thickness of lamellar cementite in the surface part obtained as described above to the thickness of lamellar cementite in the central part of the filament was obtained.

Hereinafter, measurement points will be described with reference to FIG. 5.

Figure 5:
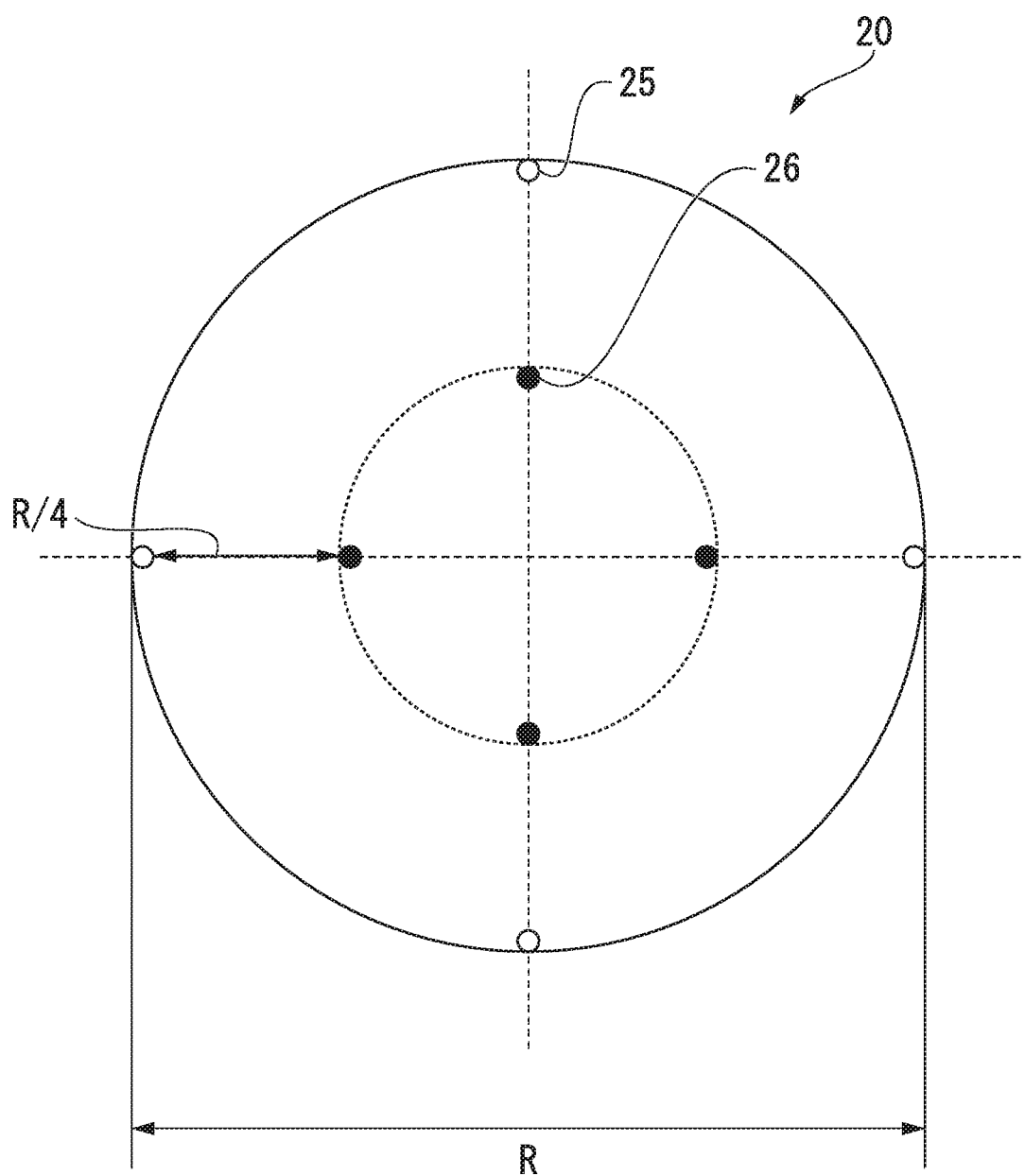
FIG. 5 is a view illustrating a method of measuring the thickness of lamellar cementite of the filament for a high strength steel cord in the embodiment of the present invention using a cross-sectional view of the filament for a high strength steel cord in the embodiment of the present invention.

FIG. 5 is a view illustrating a method of measuring the thickness of lamellar cementite of the filament for a high strength steel cord in the embodiment of the present invention using a cross-sectional view of the filament for a high strength steel cord in the embodiment of the present invention.

In the cross-sectional view of the filament 20 for a high strength steel cord in the embodiment of the present invention, four dotted lines are drawn in a radial direction from the center at every central angle of 90°, four black circles 26 are measurement points of the central part, and four white circles 25 are measurement points of the surface part.

When it is assumed that the average value of the thicknesses of lamellar cementite of the surface part is ds and the average value of the thicknesses of lamellar cementite in the central part is di, the ratio p of the thickness of lamellar cementite at the center of the thickness of the surface part to the thickness of lamellar cementite in the central part is obtained as below.

$$p = (ds/di) \times 100 (\%) \quad \text{(Expression 5)}$$

The feature of the filament for a high strength steel cord in the embodiment of the present invention is that p is 95% or less.

(Operational Effects)

In the filament for a high strength steel cord in the embodiment of the present invention, the ductility of the surface part is improved and the strength of the central part is ensured, therefore, the filament for a high strength steel cord in the embodiment of the present invention has high strength and a significant effect of achieving excellent workability during twisting performed when a steel cord is produced.

<Chemical Composition>

The filament includes, in the chemical composition, by mass %, C: 0.70% to 1.20%, Si: 0.15% to 0.60%, Mn: 0.10% to 1.00%, N: 0.0010% to 0.0050%, Al: more than 0% and 0.0100% or less, and a remainder of Fe and impurities.

The filament may further include, in the chemical composition, one or two or more of Ti: more than 0% and 0.1000% or less, Cr: more than 0% and 0.5000% or less, Co: more than 0% and 0.5000% or less, V: more than 0% and 0.5000% or less, Cu: more than 0% and 0.2000% or less, Nb: more than 0% and 0.1000% or less, Mo: more than 0% and 0.2000% or less, W: more than 0% and 0.200% or less, B: more than 0% and 0.0030% or less, REM: more than 0% and 0.0050% or less, Ca: more than 0.0005% and 0.0050% or less, Mg: more than 0.0005% and 0.0050% or less, and Zr: more than 0.0005% and 0.0100% or less.

(C: 0.70% to 1.20%)

C is an element that improves the strength of steel. In order to obtain a pearlite structure which is a eutectoid structure, the C content is preferably set to about 0.8%. Here, when the C content is less than 0.70%, a hypoeutectoid structure is formed, and a non-pearlite structure is present in a large proportion. On the other hand, when the C content is more than 1.20%, proeutectoid cementite is precipitated, and there is concern that the workability of the filament may be deteriorated. Therefore, the C content is set to be in a range of 0.70% to 1.20%.

(Si: 0.15% to 0.60%)

Si is an element that is effective in deoxidizing the steel, and is an element having a function of improving strength by being solid-solutionized in ferrite. Here, when the Si content is less than 0.15%, there is concern that the above-described operational effect cannot be sufficiently exhibited. On the other hand, when the Si content is more than 0.60%, there is concern that workability may be deteriorated. Therefore, the Si content is set to be in a range of 0.15% to 0.60%.

(Mn: 0.10% to 1.00%)

Mn is an element that is effective in deoxidizing the steel and has an operational effect of fixing S in the steel and thus suppressing the embrittlement of the steel. Here, when the Mn content is less than 0.10%, there is concern that the above-described operational effect cannot be sufficiently exhibited. On the other hand, when the Mn content is more than 1.00%, there is concern that workability may be deteriorated.

Therefore, the Mn content is set to be in a range of 0.10% to 1.00%.

(N: 0.0010% to 0.0050%)

N is an element that forms nitrides of Al and Ti and has an operational effect of suppressing coarsening of an austenite grain size. Here, when the N content is less than 0.0010%, there is concern that the above-described effect cannot be sufficiently exhibited. On the other hand, when the N content is more than 0.0050%, there is concern that ductility may be deteriorated.

Therefore, the N content is set to be in a range of 0.0010% to 0.0050%.

(Al: more than 0% and 0.0100% or less)

Al is an element having a deoxidizing action. The Al content is set to be more than 0% and 0.010% or less so as not to allow the generation of hard and non-deformable alumina-based inclusions, which may cause the deterioration in the ductility of the filament and the deterioration in drawability.

In addition, the limit of detection of Al is less than 0.001%.

In addition, the amounts of P and S which are impurities are not particularly specified and are preferably set to 0.0200% or less from the viewpoint of ensuring ductility to the same degree as that of a filament in the related art.

In addition to the base elements and impurity elements mentioned above, a wire rod for a high strength steel cord according to the embodiment may further contain, as selective elements, at least one of Ti, Cr, Co, V, Cu, Nb, Mo, W, B, REM, Ca, Mg, and Zr. Hereinafter, the range limits of the numerical values of the selective elements and the reason for the limitation will be described. Here, % described herein indicates mass %.

(Ti: more than 0% and 0.1000% or less)

Ti is an element having a deoxidizing action. In addition, Ti has an operational effect of forming nitrides and suppressing coarsening of the austenite grain size.

Here, when the Ti content is more than 0.1000%, there is concern that workability may be deteriorated due to coarse carbonitrides (TiCN and the like).

When the Ti content is less than 0.005%, there is concern that the above-described operational effect cannot be sufficiently exhibited, therefore, the Ti content is typically set to 0.005% or more. However, in a case where Al is contained, the Ti content may be set to be less than 0.0050%.

Therefore, the Ti content is set to be in a range of more than 0% and 0.1000% or less. The Ti content is more preferably in a range of 0.0050% to 0.1000%.

(Cr: more than 0% and 0.5000% or less)

Cr makes the lamellar spacing of pearlite finer and improves the strength of the filament. In order to obtain this effect, the Cr content is preferably more than 0% and 0.5000% or less.

The Cr content is more preferably 0.0010% to 0.5000%. When the Cr content is more than 0.5000%, pearlitic transformation is excessively suppressed, and there is concern that austenite may remain in the metallographic structure of the wire rod during a patenting treatment and supercooled structures such as martensite and bainite may be generated in the metallographic structure of the wire rod after the patenting treatment. In addition, there may be cases where it becomes difficult to remove surface oxides by mechanical descaling.

(Co: more than 0% and 0.5000% or less)

Co is an element that suppresses precipitation of proeutectoid cementite. In order to obtain this effect, the Co content is preferably more than 0% and 0.5000% or less. The Co content is more preferably 0.0010% to 0.5000%. When the Co content is more than 0.5000%, this effect is saturated, and there may be cases where the cost for the inclusion of Co outweighs the benefits.

(V: more than 0% and 0.5000% or less)

V is an element that forms fine carbonitrides, suppresses coarsening of austenite grains in a high temperature range, and improves the strength of the filament. In order to obtain these effects, the V content is preferably more than 0% and 0.5000% or less.

The V content is more preferably 0.0010% to 0.5000%. When the V content is more than 0.5000%, the amount of formed carbonitrides increases, and the particle size of the carbonitrides increases, therefore, there may be cases where the ductility of the filament is deteriorated.

(Cu: more than 0% and 0.2000% or less)

Cu is an element that improves corrosion resistance. In order to obtain this effect, the Cu content is preferably more than 0% and 0.2000% or less.

The Cu content is more preferably 0.0001% to 0.2000%. When the Cu content is more than 0.2000%, Cu reacts with S and is segregated in the grain boundaries as CuS, and there may be cases where flaws occur in the filament.

(Nb: more than 0% and 0.1000% or less)

Nb has an effect of improving corrosion resistance. In addition, Nb is an element that forms carbides or nitrides, and suppresses coarsening of austenite grains in a high temperature range. In order to obtain these effects, the Nb content is preferably more than 0% and 0.1000% or less.

The Nb content is more preferably 0.0005% to 0.1000%.

When the Nb content is more than 0.1000%, there may be cases where pearlitic transformation is suppressed during the patenting treatment.

(Mo: more than 0% and 0.2000% or less)

Mo is an element that is concentrated at the pearlite growth interface and suppresses the growth of pearlite due to a so-called solute drag effect. In addition, Mo is an element that suppresses the generation of ferrite and reduces the non-pearlite structure. In order to obtain these effects, the Mo content is preferably more than 0% and 0.2000% or less.

The Mo content is more preferably 0.0010% to 0.2000%.

The Mo content is even more preferably 0.005% to 0.0600%.

When the Mo content is more than 0.2000%, the growth of pearlite is suppressed, and it takes a long time to perform the patenting treatment, therefore, there may be cases where productivity may be deteriorated.

In addition, when the Mo content is more than 0.2000%, coarse $Mo_2C$ carbides are precipitated, and there may be cases where drawability is deteriorated.

(W: more than 0% and 0.2000% or less)

Like Mo, W is an element that is concentrated at the pearlite growth interface and suppresses the growth of pearlite due to the so-called solute drag effect. In addition, W is an element that suppresses the generation of ferrite and reduces the non-pearlite structure. In order to obtain these effects, the W content is preferably more than 0% and 0.2000% or less.

The W content is more preferably 0.0005% to 0.2000%.

The W content is even more preferably 0.0050% to 0.0600%.

When the W content is more than 0.20%, the growth of pearlite is suppressed, and it takes a long time to perform the patenting treatment, therefore, there may be cases where productivity may be deteriorated. In addition, when the W content is more than 0.2000%, coarse $W_2C$ carbides are precipitated, and there may be cases where drawability is deteriorated.

(B: more than 0% and 0.0030% or less)

B is an element that suppresses the generation of non-pearlite such as ferrite, degenerate-pearlite, and bainite. In addition, B is an element that forms carbides or nitrides, and suppresses coarsening of austenite grains in a high temperature range. In order to obtain these effects, the B content is preferably more than 0% and 0.0030% or less.

The B content is more preferably 0.0004% to 0.0025%.

The B content is even more preferably 0.0004% to 0.0015%.

The B content is most preferably 0.0006% to 0.0012%.

When the B content is more than 0.0030%, the precipitation of coarse $Fe_{23}(CB)_6$ carbides is promoted, and there may be cases where ductility is adversely affected.

(REM: more than 0% and 0.0050% or less)

Rare earth metal (REM) is a deoxidizing element. In addition, REM is an element that forms sulfides and detoxifies S which is an impurity. In order to obtain this effect, the REM content is preferably more than 0% and 0.0050% or less.

The REM content is more preferably 0.0005% to 0.0050%.

When the REM content is more than 0.0050%, coarse oxides are formed, and there may be cases where wire breaking occurs during drawing. In addition, REM is a generic term for a total of 17 elements including 15 elements from lanthanum with atomic number 57 to lutetium with atomic number 71, scandium with atomic number 21, and yttrium with atomic number 39. Typically, REM is supplied in the form of mischmetal which is a mixture of these elements and is added to the steel.

(Ca: more than 0.0005% and 0.0050% or less)

Ca is an element that reduces hard alumina-based inclusions. In addition, Ca is an element that forms fine oxides. As a result, the pearlite block size of the filament becomes finer, and the ductility of the filament is improved. In order to obtain these effects, the Ca content is preferably more than 0.0005% and 0.0050% or less.

The Ca content is more preferably 0.0005% to 0.0040%.

When the Ca content is more than 0.0050%, coarse oxides are formed, and there may be cases where wire breaking occurs during drawing. In addition, in typical operational conditions, Ca is unavoidably contained at an amount of about 0.0003%.

(Mg: more than 0.0005% and 0.0050% or less)

Mg is an element that forms fine oxides in the steel. As a result, the pearlite block size of the filament becomes finer, and the ductility of the filament is improved. In order to obtain this effect, the Mg content is preferably more than 0.0005% and 0.0050% or less.

The Mg content is more preferably more than 0.0005% and 0.0040% or less.

When the Mg content is more than 0.0050%, coarse oxides are formed, and there may be cases where wire breaking occurs during drawing.

In addition, in typical operational conditions, Mg is unavoidably contained at an amount of about 0.0001%.

(Zr: more than 0.0005% and 0.0100% or less)

Zr is crystallized as ZrO and becomes the crystallization nucleus of austenite and is thus an element that increases the equiaxed austenite ratio and makes austenite grains finer.

As a result, the pearlite block size of the filament becomes finer, and the ductility of the filament is improved. In order to obtain this effect, the Zr content is preferably more than 0.0005% and 0.010% or less.

The Zr content is more preferably 0.0005% to 0.0050%.

When the Zr content is more than 0.0100%, coarse oxides are formed, and there may be cases where wire breaking occurs during drawing.

(Operational Effects)

Since the chemical composition and the metallographic structure are employed, the central part of the filament for a high strength steel cord in the embodiment includes the pearlite structure in a proportion of 95% to 100% by area %, and thus the central part ensures sufficient strength and has excellent ductility.

As a result, the occurrence of a twisting defect can be prevented by suppressing the occurrence of a delamination phenomenon, and a reduction in the weight of the steel cord can be achieved.

<Production Method>

A production method of the filament for a high strength steel cord in the embodiment of the present invention will be described.

As the production method of the filament for a high strength steel cord in the embodiment of the present invention, there are two major methods.

In a first method, a filament is produced by rough drawing a wire rod for a high strength steel cord subjected to an in-line heat treatment process S02, which will be described later, and performing finish drawing thereon.

In a second method, a filament is produced by using a wire rod which is not subjected to the in-line heat treatment process S02 described later, heating a steel wire to 950° C. to 1250° C. in an oxidizing atmosphere in a patenting process S07 described later, promoting decarburization from the surface layer of the steel wire so that the steel wire has a surface part and a central part in which C contents are different after the patenting, thereafter performing rough drawing thereon, and thereafter performing finish drawing thereon.

Figure 2:
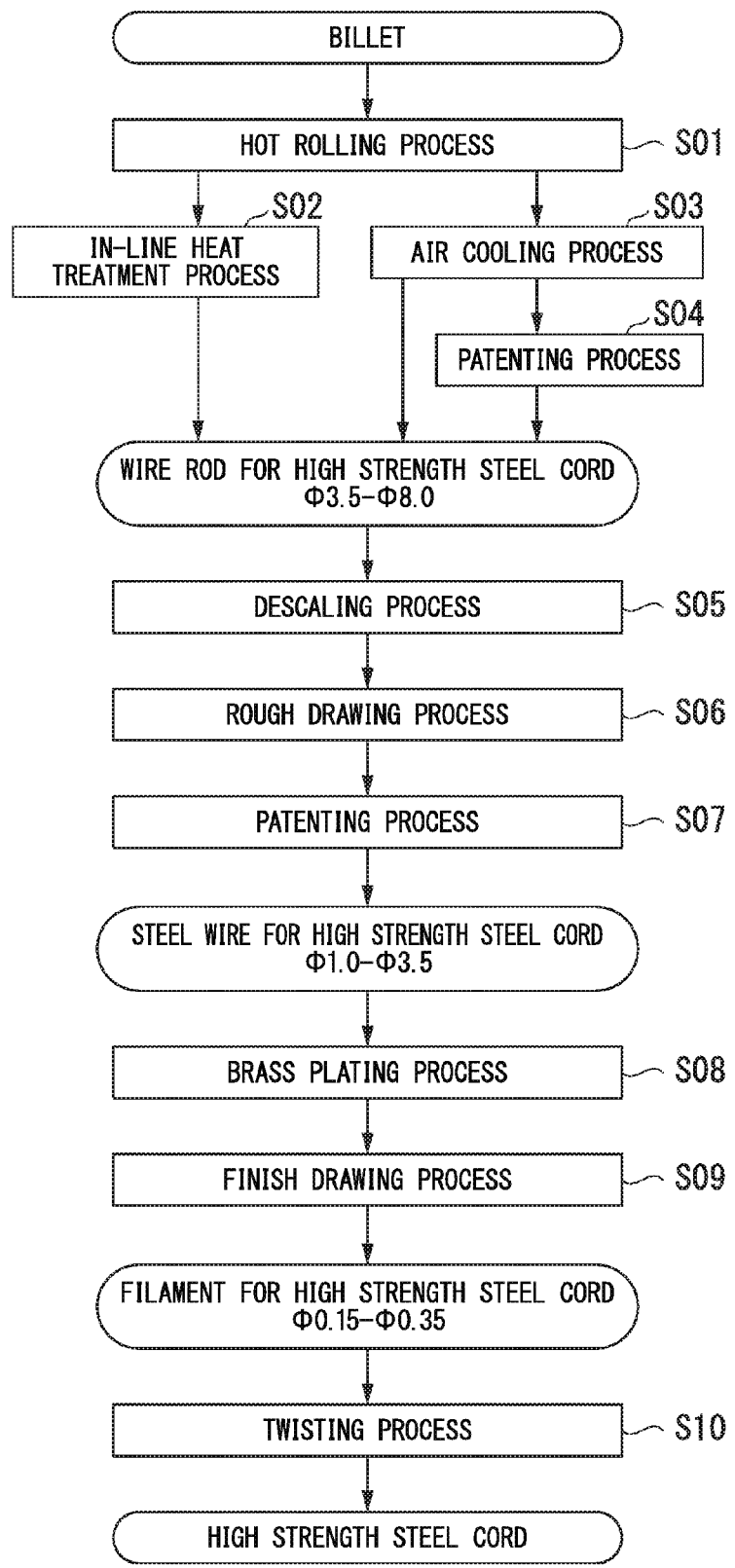
FIG. 2 is a flowchart illustrating a production method of the filament for a high strength steel cord in the embodiment of the present invention.

Hereinafter, the methods will be described in detail with reference to mainly FIG. 2.

(Chemical Composition)

In order to produce the filament for a high strength steel cord in the embodiment of the present invention, a billet adjusted to the following chemical composition is used.

For example, the billet contains, in the chemical composition, by mass %, C: 0.70% to 1.20%, Si: 0.15% to 0.60%, Mn: 0.10% to 1.00%, N: 0.0010% to 0.0050%, Al: more than 0% and 0.0100% or less, and a remainder of Fe and impurities.

The billet may further contain, in the chemical composition, by mass %, one or two or more of Ti: more than 0% and 0.1000% or less, Cr: more than 0% and 0.5000% or less, Co: more than 0% and 0.5000% or less, V: more than 0% and 0.5000% or less, Cu: more than 0% and 0.2000% or less, Nb: more than 0% and 0.1000% or less, Mo: more than 0% and 0.2000% or less, W: more than 0% and 0.200% or less, B: more than 0% and 0.0030% or less, REM: more than 0% and 0.0050% or less, Ca: more than 0.0005% and 0.0050% or less, Mg: more than 0.0005% and 0.0050% or less, and Zr: more than 0.0005% and 0.0100% or less.

(Hot Rolling Process S01)

The billet is heated to 950° C. to 1250° C. in a heating furnace and is subjected to hot finish rolling to a wire diameter of 3.5 mm to 8.0 mm in this process. The finish rolling temperature is 950° C. to 1050° C., and a time needed for the finish rolling to a wire diameter of φ 8 mm or less is 0.1 seconds to 10 seconds.

During heating in the heating furnace, the amount of decarburization from the surface layer is controlled by the heating furnace atmosphere, heating temperature, and heating time so that the C content in the vicinity of the surface layer of the wire rod after being rolled is 40% to 95% of the C content at the center O.

Figure 3:
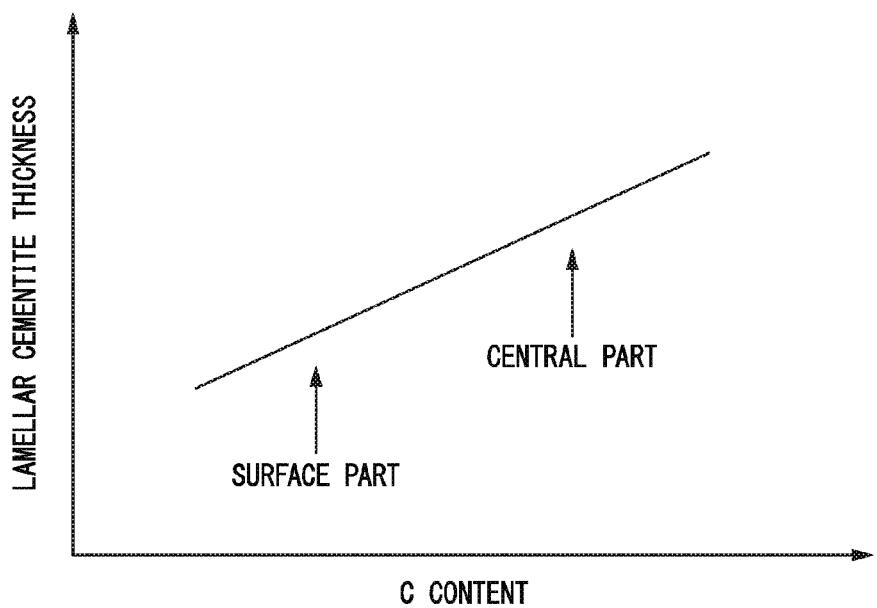
FIG. 3 is a conceptual diagram showing the relationship between the C content of drawn pearlite steel and the thickness of lamellar cementite.

As illustrated in FIG. 3, the C content becomes different between the vicinity of the center of the wire rod and the surface part 21 after the hot rolling by controlling the amount of decarburization such that the central part 22 and the surface part 21 are formed.

(In-Line Heat Treatment Process S02)

The finish rolled wire rod is wound at 900° C.±100° C., is air-cooled at 10° C./s to 20° C./s, and is held or subjected to DLP at 500° C. to 600° C. While being held or subjected to DLP at 500° C. to 600° C., the temperature of the center of the wire rod is 530° C. to 630° C.

The inventors found that in this in-line heat treatment process, the ratio of the thickness of lamellar cementite at the center of the thickness of the surface part of the wire rod to the thickness of lamellar cementite in the central part of the wire rod reaches 95% or less.

As described above, in the hot rolling process S01 and the in-line heat treatment process S02, the wire rod for a high strength steel cord in which the ratio of the thickness of lamellar cementite at the center of the thickness of the surface part of the wire rod to the thickness of lamellar cementite in the central part of the wire rod reaches 95% or less is produced.

By using the wire rod for a high strength steel cord produced as described above, a filament for a high strength steel cord, which includes the surface part 21 and the central part 22 in which the C content at the center of the surface part is 40% to 95% of the C content of the central part, can be produced.

(Air Cooling Process S03)

The finish rolled wire rod is subjected to forced air cooling by a stelmor or naturally cooling in an air cooling process S03 in a case where the in-line heat treatment process S02 is not performed.

(Patenting Process S04)

There may be cases where the wire rod subjected to the air cooling process S03 is subjected to a heat treatment through reheating.

In the air cooling process S03 and the patenting process S04, the wire rod for a high strength steel cord is produced.

(Descaling Process S05)

The wire rod for a high strength steel cord, which is produced through the in-line heat treatment process S02, or through the air cooling process S03 and the patenting process S04, is subjected to a chemical treatment such as pickling or a mechanical treatment to remove oxide scale formed on the surface thereof.

(Rough Drawing Process S06)

The wire rod for a high strength steel cord from which oxide scale has been removed is subjected to dry drawing, thereby producing a steel wire having a wire diameter of 1.0 mm to 3.5 mm.

(Patenting Process S07)

(S07-1) In Case of not Performing in-Line Heat Treatment Process S02

The steel wire for a high strength steel cord produced in the rough drawing process S06 using the wire rod for a high strength steel cord produced in the air cooling process S03 and the patenting process S04 or the wire rod for a high strength steel cord produced only through the air cooing process S03 is heated to 850° C. to 1000° C. and is immediately thereafter subjected to a patenting treatment under a temperature condition of 530° C. to 580° C. for high-strengthening.

The inventors found that when the amount of decarburization from the surface layer is controlled in the patenting heating process so that the C content at the center of the surface part is 40% to 95% of the C content of the central part, the C content becomes different between the central part 22 and the surface part 21 of the steel wire after the patenting, and the steel wire in which the central part and the decarburized surface part are formed can be produced.

(S07-2) In Case of Performing In-Line Heat Treatment Process S02

The steel wire for a high strength steel cord produced in the rough drawing process S04 using the wire rod for a high strength steel cord produced through the in-line heat treatment process S02 is heated to 850° C. to 1000° C. and is immediately thereafter subjected to a patenting process under a temperature condition of 530° C. to 580° C. for high-strengthening.

By performing finish drawing on the steel wire for a high strength steel cord described above, the filament for a high strength steel cord which includes the surface part 21 and the central part 22 in which the C content at the center of the surface part is 40% to 95% of the C content of the central part can be produced.

That is, even after the patenting process S07, a state in which the C content of the surface part of the steel wire for a high strength steel cord in the embodiment of the present invention is low continues and a state in which the C content of the surface part is low and lamellar cementite of the surface part is fine is maintained even in the filament for a high strength steel cord.

(Brass Plating Process S08)

Brass plating is performed on the surface of the steel wire for a high strength steel cord. A brass plating is formed to ensure the adhesion between rubber and a steel cord.

(Finish Drawing Process S09)

Wet drawing is performed on the steel wire for a high strength steel cord subjected to the brass plating to achieve a wire diameter of 0.1 mm to 0.4 mm, and preferably 0.15 mm to 0.35 mm.

Accordingly, the filament for a high strength steel cord in the embodiment of the present invention is produced.

FIG. 3 is a conceptual diagram showing the relationship between the C content of drawn pearlite steel and the thickness of lamellar cementite. In FIG. 3, the horizontal axis represents the C content, and the vertical axis represents the thickness of lamellar cementite. The C content increases toward the right in the horizontal axis, and the thickness of lamellar cementite increases upward in the vertical axis.

In the filament for a high strength steel cord in the embodiment of the present invention, the thickness of lamellar cementite in the surface layer decreases as the C content of the surface part decreases as shown in FIG. 3.

Figure 4:
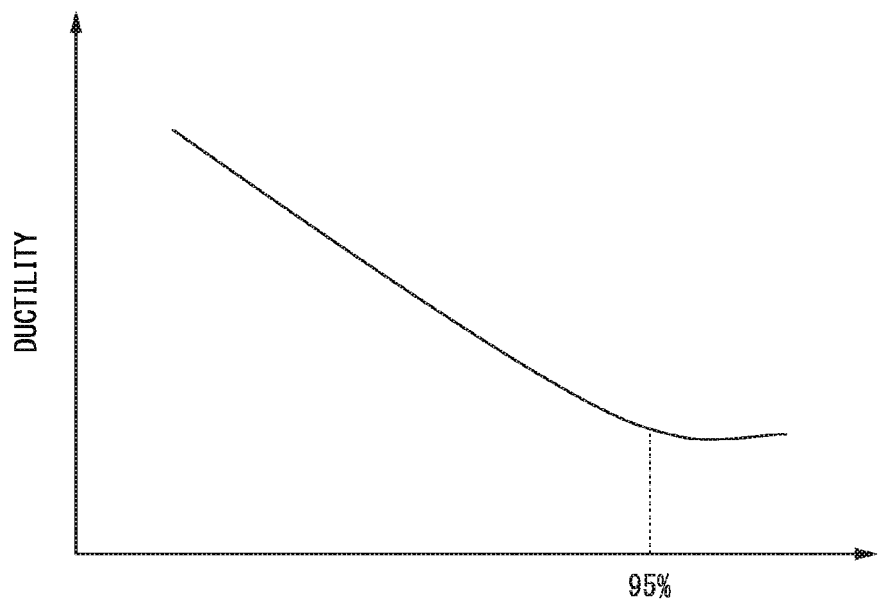
FIG. 4 is a conceptual diagram showing the relationship between the ratio of the thickness of lamellar cementite at the center of the thickness of a surface part of drawn pearlite steel to the thickness of lamellar cementite in a central part and ductility.

FIG. 4 is a conceptual diagram showing the relationship between the ratio of the thickness of lamellar cementite at the center of the thickness of the surface part of drawn pearlite steel to the thickness of lamellar cementite in the central part and ductility. In FIG. 4, the horizontal axis represents the ratio of the thickness of lamellar cementite at the center of the thickness of the surface part to the thickness of lamellar cementite in the central part, and the vertical axis represents the ductility. The ratio of the thickness of lamellar cementite at the center of the thickness of the surface part to the thickness of lamellar cementite in the central part increases toward the right in the horizontal axis, and the ductility increases upward in the vertical axis.

As shown in FIG. 4, when the ratio between the cementite thicknesses of the surface part 21 and the central part 22 is 95% or less, ductility is improved.

(Twisting Process S10)

Twisting is performed using a plurality of filaments for a high strength steel cord in the embodiment of the present invention. Accordingly, a high strength steel cord having a twisted structure is produced.

(Operational Effects)

In the filament for a high strength steel cord in the embodiment of the present invention, the ductility of the surface part is improved and the strength of the central part is ensured, therefore, the filament for a high strength steel cord in the embodiment of the present invention has high strength and a significant effect of achieving excellent workability during twisting performed when a steel cord is produced.

While the filament for a high strength steel cord in the embodiment of the present invention has been described above, the wire diameter of the hot rolled wire rod or the wire diameter of the filament for a high strength steel cord are not limited to the following Examples as long as the wire diameters and the like are within the ranges of the embodiment.

Example 1

In a case where C: 0.70% to 1.20%, Si: 0.15% to 0.60%, Mn: 0.10% to 1.00%, N: 0.0010% to 0.0050%, Al: more than 0% and 0.0100% or less, and a remainder of Fe and impurities are included in the chemical composition by mass %, the effects of the present invention will be described using Examples of the present invention and Comparative Examples.

In Table 1, the chemical compositions of Examples of the present invention and Comparative Examples are shown.

Regarding the Al composition in Table 1, the description "---" indicates that the Al content is less than the limit of detection of Al.

[Table 1]

Filaments for a high strength steel cord of Examples 1 to 24 of the present invention and Comparative Examples 25 to 34 were produced by rough drawing the wire rod for a high strength steel cord subjected to 1) the in-line heat treatment process S02 and performing finish drawing thereon.

During the finish drawing, wet drawing was performed on the steel wire for a high strength steel cord subjected to the brass plating to achieve a wire diameter of 0.15 mm to 0.35 mm.

For the produced filament for a high strength steel cord, the center pearlite area fraction (%), the wire diameter R (mm) after drawing, the thickness (μm) of the surface part, the ratio (%) between the lamellar cementite thicknesses of the surface part and the central part, the presence or absence of delamination, and the tensile strength (MPa) were evaluated.

In addition, the presence or absence of delamination was determined by conducting a torsion test on the filament. In a case where a torsion test is conducted on the filament, when delamination occurs, a fracture surface generated due to torsional fracture is not a shear fracture surface but a fractured surface generated along longitudinal cracks. Therefore, the presence or absence of delamination can be determined by visually determining the fractured shape of the steel wire formed due to torsional fracture.

In addition, the tensile strength TS was obtained by a tensile test based on "Method of tensile test for metallic materials" in its Z 2241.

[Table 2]

The evaluation results are shown in Table 2.

In Examples 1 to 24 of the present invention, the tensile strength of the filament was 3200 MPa or more, the delamination phenomenon had not occurred, and the comprehensive evaluation was graded as good (G).

The comprehensive evaluation of Comparative Examples 25 to 34 was graded as bad (B). Hereinafter, the reason that the comprehensive evaluation of Comparative Examples 25 to 34 was graded as bad (B) will be described.

In Comparative Example 25, since the C content was 0.68% which is less than the lower limit, the center pearlite area fraction of the filament was 93% which is less than the lower limit, and the tensile strength was 3134 MPa which is a value less than 3200 MPa.

In Comparative Example 26, since the C content was 1.23% which is more than the upper limit, delamination had occurred.

In Comparative Example 27, since the Si content was 0.12% which is less than the lower limit, the tensile strength was 3142 MPa which is a value less than 3200 MPa.

In Comparative Example 28, since the Si content was 0.65% which is more than the upper limit, delamination had occurred.

In Comparative Example 29, since the Mn content was 0.09% which is less than the lower limit, the tensile strength was 3136 MPa which is a value less than 3200 MPa.

In Comparative Example 30, since the Mn content was 1.04% which is more than the upper limit, delamination had occurred.

In Comparative Example 31, since the Al content was 0.012% which is more than the upper limit, delamination had occurred.

In Comparative Example 32, since the N content was 0.0055% which is more than the upper limit, delamination had occurred.

In Comparative Example 33, since the surface part reached the lower limit of measurement or less, delamination had occurred. In addition, that the surface part reaches the lower limit of measurement or less indicates a case where the C content of the surface layer is more than 95% of the C content of the central part. In this case, the ratio between the lamellar cementite thicknesses reached 96% which is a value more than 95%. During measurement, regions that were determined in advance by (Expression 3) or (Expression 4) were regarded as the surface part and the ratio between the lamellar cementite thicknesses was measured.

In Comparative Example 34, since the thickness of the surface part was 21.3 Jim which is more than the upper limit, the tensile strength of the filament was 3108 MPa which is a value less than 3200 MPa.

Example 2

In a case where one or two or more of Ti: more than 0% and 0.1000% or less, Cr: more than 0% and 0.5000% or less, Co: more than 0% and 0.5000% or less, V: more than 0% and 0.5000% or less, Cu: more than 0% and 0.2000% or less, Nb: more than 0% and 0.1000% or less, Mo: more than 0% and 0.2000% or less, W: more than 0% and 0.200% or less, B: more than 0% and 0.0030% or less, REM: more than 0% and 0.0050% or less, Ca: more than 0.0005% and 0.0050% or less, Mg: more than 0.0005% and 0.0050% or less, and Zr: more than 0.0005% and 0.0100% or less are further included in the chemical composition by mass %, the effects of the present invention will be described using Examples of the present invention and Comparative Examples.

In Table 3, the chemical compositions of Examples of the present invention and Comparative Examples are shown.

Regarding the Al composition in Table 3, the description "---" indicates that the Al content is less than the limit of detection of Al.

In Table 3, in the chemical composition other than Al, the description "---" indicates that the corresponding element is not contained.

[Table 3]

Filaments for a high strength steel cord of Examples 35 to 58 of the present invention and Comparative Examples 59 to 68 were produced by rough drawing the wire rod for a high strength steel cord subjected to 1) the in-line heat treatment process S02 and performing finish drawing thereon.

During the finish drawing, wet drawing was performed on the steel wire for a high strength steel cord subjected to the brass plating to achieve a wire diameter of 0.15 mm to 0.35 mm.

For the obtained filament for a high strength steel cord, the center pearlite area fraction (%), the wire diameter R (mm), the thickness (μm) of the surface part, the ratio (%) between the lamellar cementite thicknesses of the surface part and the central part, the presence or absence of delamination, and the tensile strength (MPa) were evaluated.

During the finish drawing, wet drawing was performed on the steel wire for a high strength steel cord subjected to the brass plating to achieve a wire diameter of 0.15 mm to 0.35 mm.

In addition, the presence or absence of delamination was determined by conducting a torsion test on the filament. In a case where a torsion test is conducted on the filament in which delamination has occurred, a fracture surface generated due to torsional fracture is not a shear fracture surface but a fractured surface generated along longitudinal cracks. Therefore, the presence or absence of delamination can be determined by visually determining the fractured shape of the steel wire formed due to torsional fracture.

In addition, the tensile strength TS was obtained by a tensile test based on "Method of tensile test for metallic materials" in JIS Z 2241.

[Table 4]
The evaluation results are shown in Table 4.

In Examples 35 to 58 of the present invention, the tensile strength of the filament was 3200 MPa or more, the delamination phenomenon had not occurred, and the comprehensive evaluation was graded as good (G).

The comprehensive evaluation of Comparative Examples 59 to 68 was graded as bad (B). Hereinafter, the reason that the comprehensive evaluation of Comparative Examples 59 to 68 was graded as bad (B) will be described.

In Comparative Example 59, since the C content was 0.68% which is less than the lower limit, the center pearlite area fraction of the filament was 94% which is less than the lower limit, and the tensile strength was 3146 MPa which is a value less than 3200 MPa.

In Comparative Example 60, since the C content was 1.23% which is more than the upper limit, delamination had occurred.

In Comparative Example 61, since the Si content was 0.12% which is less than the lower limit, the tensile strength was 3168 MPa which is a value less than 3200 MPa.

In Comparative Example 62, since the Si content was 0.65% which is more than the upper limit, delamination had occurred.

In Comparative Example 63, since the Mn content was 0.09% which is less than the lower limit, the tensile strength was 3154 MPa which is a value less than 3200 MPa.

In Comparative Example 64, since the Mn content was 1.04% which is more than the upper limit, delamination had occurred.

In Comparative Example 65, since the Al content was 0.012% which is more than the upper limit, delamination had occurred.

In Comparative Example 66, since the N content was 0.0055% which is more than the upper limit, delamination had occurred.

In Comparative Example 67, since the surface part reached the lower limit of measurement or less, delamination had occurred. In addition, that the surface part reaches the lower limit of measurement or less indicates a case where the C content of the surface layer is more than 95% of the C content of the central part. In this case, the ratio between the lamellar cementite thicknesses reached 96% which is a value more than 95%. During measurement, regions that were determined in advance by (Expression 3) or (Expression 4) were regarded as the surface part and the ratio between the lamellar cementite thicknesses was measured.

In Comparative Example 68, since the thickness of the surface part was 21.1 μm which is more than the upper limit, the tensile strength of the filament was 3129 MPa which is a value less than 3200 MPa.

From the above description, according to the present invention, it was confirmed that it is possible to provide a filament for a high strength steel cord which enables a high strength steel cord having high strength and excellent workability to be stably produced.

INDUSTRIAL APPLICABILITY

The filament for a high strength steel cord of the present invention can be used to produce a steel cord.

BRIEF DESCRIPTION OF THE REFERENCE SYMBOLS

20: FILAMENT FOR HIGH STRENGTH STEEL CORD
21: SURFACE PART
22: CENTRAL PART

25: MEASUREMENT POINT OF SURFACE PART
26: MEASUREMENT POINT OF CENTRAL PART

TABLE 1

| TYPE | No. | CHEMICAL COMPOSITION (mass %) | | | | |
| --- | --- | --- | --- | --- | --- | --- |
| | | C | Si | Mn | Al | N |
| EXAMPLES OF PRESENT INVENTION | 1 | 0.72 | 0.16 | 0.12 | 0.006 | 0.0025 |
| | 2 | 0.71 | 0.17 | 0.78 | — | 0.0011 |
| | 3 | 0.71 | 0.16 | 0.98 | — | 0.0028 |
| | 4 | 0.73 | 0.31 | 0.11 | — | 0.0026 |
| | 5 | 0.71 | 0.30 | 0.78 | — | 0.0035 |
| | 6 | 0.72 | 0.32 | 0.98 | 0.006 | 0.0048 |
| | 7 | 0.71 | 0.59 | 0.13 | — | 0.0034 |
| | 8 | 0.71 | 0.58 | 0.78 | 0.009 | 0.0031 |
| | 9 | 0.71 | 0.59 | 0.99 | 0.001 | 0.0031 |
| | 10 | 0.82 | 0.17 | 0.98 | — | 0.0028 |
| | 11 | 0.81 | 0.31 | 0.12 | — | 0.0026 |
| | 12 | 0.80 | 0.58 | 0.76 | — | 0.0035 |
| | 13 | 0.88 | 0.59 | 0.14 | 0.001 | 0.0034 |
| | 14 | 0.89 | 0.34 | 0.96 | 0.003 | 0.0031 |
| | 15 | 0.90 | 0.17 | 0.76 | — | 0.0031 |
| | 16 | 0.99 | 0.30 | 0.96 | — | 0.0028 |
| | 17 | 0.98 | 0.59 | 0.13 | — | 0.0026 |
| | 18 | 1.00 | 0.17 | 0.97 | 0.003 | 0.0035 |
| | 19 | 1.09 | 0.17 | 0.96 | 0.001 | 0.0034 |
| | 20 | 1.07 | 0.31 | 0.12 | — | 0.0031 |
| | 21 | 1.09 | 0.59 | 0.76 | — | 0.0031 |
| | 22 | 1.19 | 0.16 | 0.13 | 0.003 | 0.0031 |
| | 23 | 1.18 | 0.30 | 0.78 | — | 0.0028 |
| | 24 | 1.19 | 0.59 | 0.98 | 0.002 | 0.0026 |
| COMPARATIVE EXAMPLES | 25 | 0.68 | 0.16 | 0.12 | 0.005 | 0.0031 |
| | 26 | 1.23 | 0.30 | 0.78 | — | 0.0028 |
| | 27 | 0.80 | 0.12 | 0.13 | — | 0.0026 |
| | 28 | 0.72 | 0.65 | 0.12 | — | 0.0035 |
| | 29 | 0.81 | 0.17 | 0.09 | — | 0.0035 |
| | 30 | 0.89 | 0.39 | 1.04 | 0.006 | 0.0048 |
| | 31 | 0.82 | 0.29 | 0.12 | 0.012 | 0.0036 |
| | 32 | 0.79 | 0.25 | 0.35 | — | 0.0055 |
| | 33 | 0.89 | 0.39 | 0.46 | 0.003 | 0.0031 |
| | 34 | 0.82 | 0.29 | 0.12 | 0.005 | 0.0031 |

TABLE 2

| TYPE | No. | EVALUATION OF CHARACTERISTICS OF FILAMENT | | | | | | |
| --- | --- | --- | --- | --- | --- | --- | --- | --- |
| | | CENTER PEARLITE AREA FRACTION (%) | WIRE DIAMETER AFTER DRAWING (mm) | THICKNESS OF SURFACE PART (μm) | RATIO BETWEEN LAMELLAR CEMENTITE THICKNESSES (%) | OCCURRENCE OF DELAMINATION | TENSILE STRENGTH TS (MPa) | COMPREHENSIVE EVALUATION |
| EXAMPLES OF PRESENT INVENTION | 1 | 96 | 0.15 | 2.5 | 72 | ABSENT | 3701 | G |
| | 2 | 97 | 0.18 | 3.1 | 73 | ABSENT | 3818 | G |
| | 3 | 98 | 0.20 | 10.5 | 82 | ABSENT | 3732 | G |
| | 4 | 95 | 0.30 | 20.4 | 87 | ABSENT | 3763 | G |
| | 5 | 97 | 0.35 | 3.4 | 90 | ABSENT | 3804 | G |
| | 6 | 98 | 0.15 | 15.5 | 92 | ABSENT | 3713 | G |
| | 7 | 97 | 0.18 | 7.6 | 82 | ABSENT | 3758 | G |
| | 8 | 96 | 0.20 | 6.3 | 93 | ABSENT | 3715 | G |
| | 9 | 97 | 0.30 | 8.0 | 72 | ABSENT | 3730 | G |
| | 10 | 98 | 0.35 | 9.4 | 71 | ABSENT | 4008 | G |
| | 11 | 95 | 0.15 | 2.3 | 83 | ABSENT | 3996 | G |
| | 12 | 98 | 0.18 | 3.8 | 72 | ABSENT | 3993 | G |
| | 13 | 97 | 0.20 | 4.2 | 71 | ABSENT | 4196 | G |
| | 14 | 99 | 0.30 | 8.4 | 82 | ABSENT | 4203 | G |
| | 15 | 97 | 0.35 | 9.1 | 80 | ABSENT | 4216 | G |
| | 16 | 98 | 0.15 | 5.5 | 72 | ABSENT | 4323 | G |
| | 17 | 98 | 0.18 | 6.6 | 81 | ABSENT | 4308 | G |
| | 18 | 97 | 0.20 | 7.3 | 75 | ABSENT | 4282 | G |
| | 19 | 96 | 0.30 | 8.2 | 82 | ABSENT | 4512 | G |
| | 20 | 97 | 0.35 | 9.0 | 82 | ABSENT | 4532 | G |
| | 21 | 96 | 0.15 | 6.3 | 74 | ABSENT | 4545 | G |
| | 22 | 98 | 0.18 | 3.3 | 82 | ABSENT | 4746 | G |
| | 23 | 97 | 0.20 | 6.5 | 77 | ABSENT | 4783 | G |
| | 24 | 96 | 0.30 | 7.1 | 79 | ABSENT | 4782 | G |
| COMPARATIVE EXAMPLES | 25 | 93 | 0.30 | 9.8 | 72 | ABSENT | 3134 | B |
| | 26 | 97 | 0.18 | 4.8 | 83 | PRESENT | 4772 | B |
| | 27 | 96 | 0.20 | 9.4 | 73 | ABSENT | 3142 | B |
| | 28 | 95 | 0.20 | 10.7 | 70 | PRESENT | 3988 | B |
| | 29 | 95 | 0.23 | 5.0 | 83 | ABSENT | 3136 | B |
| | 30 | 96 | 0.25 | 5.0 | 82 | PRESENT | 4013 | B |
| | 31 | 95 | 0.21 | 9.6 | 73 | PRESENT | 3996 | B |
| | 32 | 97 | 0.18 | 5.1 | 82 | PRESENT | 3882 | B |
| | 33 | 96 | 0.21 | 0.0 | 96 | PRESENT | 3968 | B |
| | 34 | 95 | 0.20 | 21.3 | 68 | ABSENT | 3108 | B |

TABLE 3

| TYPE | No. | CHEMICAL COMPOSITION (mass %) | | | | | | | | |
|---|---|---|---|---|---|---|---|---|---|---|
| | | C | Si | Mn | Al | N | Ti | Cr | Mo | Cu | V |
| EXAMPLES OF PRESENT INVENTION | 35 | 0.72 | 0.16 | 0.11 | 0.006 | 0.0025 | — | 0.49 | — | — | — |
| | 36 | 0.71 | 0.17 | 0.79 | — | 0.0011 | 0.030 | 0.01 | — | — | 0.05 |
| | 37 | 0.71 | 0.16 | 0.99 | — | 0.0028 | 0.096 | 0.05 | 0.19 | — | — |
| | 38 | 0.73 | 0.31 | 0.12 | — | 0.0026 | 0.006 | — | — | 0.05 | — |
| | 39 | 0.71 | 0.30 | 0.79 | — | 0.0035 | 0.012 | 0.19 | 0.05 | — | — |
| | 40 | 0.72 | 0.32 | 0.99 | 0.006 | 0.0048 | — | 0.20 | — | — | 0.12 |
| | 41 | 0.71 | 0.59 | 0.11 | — | 0.0034 | 0.050 | 0.49 | — | 0.12 | — |
| | 42 | 0.71 | 0.58 | 0.79 | 0.009 | 0.0031 | — | 0.18 | — | — | — |
| | 43 | 0.71 | 0.59 | 0.98 | 0.001 | 0.0031 | — | — | 0.19 | — | — |
| | 44 | 0.82 | 0.17 | 0.99 | — | 0.0028 | 0.032 | — | — | — | — |
| | 45 | 0.81 | 0.31 | 0.12 | — | 0.0026 | 0.006 | 0.19 | — | 0.19 | — |
| | 46 | 0.80 | 0.58 | 0.79 | — | 0.0035 | 0.012 | 0.20 | 0.05 | — | — |
| | 47 | 0.88 | 0.59 | 0.12 | 0.001 | 0.0034 | 0.015 | 0.19 | — | — | — |
| | 48 | 0.89 | 0.34 | 0.98 | 0.003 | 0.0031 | 0.032 | 0.20 | — | — | 0.49 |
| | 49 | 0.90 | 0.17 | 0.78 | — | 0.0031 | — | — | — | 0.05 | — |
| | 50 | 0.99 | 0.30 | 0.98 | — | 0.0028 | 0.006 | 0.35 | 0.19 | — | — |
| | 51 | 0.98 | 0.59 | 0.12 | — | 0.0026 | 0.012 | — | — | — | — |
| | 52 | 1.00 | 0.17 | 0.99 | 0.003 | 0.0035 | — | 0.20 | — | — | 0.05 |
| | 53 | 1.09 | 0.17 | 0.98 | 0.001 | 0.0034 | 0.006 | 0.19 | 0.05 | — | — |
| | 54 | 1.07 | 0.31 | 0.12 | — | 0.0031 | 0.015 | 0.32 | — | — | — |
| | 55 | 1.09 | 0.59 | 0.79 | — | 0.0031 | 0.032 | — | — | 0.19 | — |
| | 56 | 1.19 | 0.16 | 0.12 | 0.003 | 0.0031 | — | 0.19 | — | — | — |
| | 57 | 1.18 | 0.30 | 0.79 | — | 0.0028 | — | 0.20 | — | — | 0.07 |
| | 58 | 1.19 | 0.59 | 0.98 | 0.002 | 0.0026 | — | — | 0.19 | — | — |
| COMPARATIVE EXAMPLES | 59 | 0.68 | 0.16 | 0.12 | 0.005 | 0.0031 | — | 0.19 | — | — | — |
| | 60 | 1.23 | 0.30 | 0.79 | — | 0.0028 | — | 0.20 | — | — | 0.07 |
| | 61 | 0.80 | 0.12 | 0.12 | — | 0.0026 | 0.006 | 0.19 | — | 0.19 | — |
| | 62 | 0.72 | 0.65 | 0.13 | — | 0.0035 | 0.012 | 0.19 | 0.05 | — | — |
| | 63 | 0.81 | 0.17 | 0.09 | — | 0.0035 | — | 0.20 | — | — | 0.12 |
| | 64 | 0.89 | 0.39 | 1.04 | 0.006 | 0.0048 | 0.032 | 0.36 | 0.21 | — | — |
| | 65 | 0.82 | 0.29 | 0.12 | 0.012 | 0.0036 | 0.050 | 0.05 | — | 0.20 | 0.05 |
| | 66 | 0.79 | 0.25 | 0.35 | — | 0.0055 | — | 0.54 | 0.35 | 0.03 | — |
| | 67 | 0.89 | 0.39 | 0.46 | 0.003 | 0.0031 | — | 0.20 | — | — | 0.07 |
| | 68 | 0.82 | 0.29 | 0.12 | 0.005 | 0.0031 | — | 0.19 | — | — | 0.07 |

| TYPE | No. | CHEMICAL COMPOSITION (mass %) | | | | | | | |
|---|---|---|---|---|---|---|---|---|---|
| | | Co | W | Nb | B | Mg | Ca | REM | Zr |
| EXAMPLES OF PRESENT INVENTION | 35 | 0.05 | — | — | — | — | — | — | — |
| | 36 | — | — | — | 0.0025 | — | — | — | — |
| | 37 | — | — | — | — | — | — | — | — |
| | 38 | — | 0.19 | — | — | — | — | — | — |
| | 39 | 0.13 | — | — | 0.0010 | — | — | — | — |
| | 40 | — | — | — | — | — | — | — | — |
| | 41 | — | — | — | — | — | — | 0.0029 | — |
| | 42 | 0.49 | — | 0.090 | 0.0010 | — | 0.0029 | — | — |
| | 43 | — | — | — | — | 0.0029 | — | — | — |
| | 44 | — | 0.070 | — | — | — | — | — | 0.0005 |
| | 45 | — | — | — | 0.0010 | — | — | — | — |
| | 46 | — | — | — | — | — | — | 0.0049 | — |
| | 47 | — | — | — | — | — | 0.0049 | — | — |
| | 48 | — | — | — | — | 0.0049 | — | — | — |
| | 49 | — | — | — | 0.0007 | — | — | — | 0.0009 |
| | 50 | — | — | — | — | — | — | — | — |
| | 51 | 0.12 | — | — | — | — | — | — | — |
| | 52 | — | — | — | — | — | — | — | — |
| | 53 | — | — | — | 0.0007 | — | — | — | — |
| | 54 | — | — | 0.020 | — | — | — | — | — |
| | 55 | — | 0.070 | — | — | — | — | — | — |
| | 56 | — | — | — | — | — | — | — | — |
| | 57 | — | — | — | — | — | — | — | — |
| | 58 | — | — | — | — | — | — | — | — |
| COMPARATIVE EXAMPLES | 59 | — | — | — | — | — | — | — | — |
| | 60 | — | — | — | — | — | — | — | — |
| | 61 | — | — | — | 0.0010 | — | — | — | 0.0021 |
| | 62 | 0.13 | — | — | 0.0010 | — | — | 0.0027 | — |
| | 63 | — | — | — | — | — | 0.0031 | — | — |
| | 64 | — | — | — | — | 0.0038 | — | — | — |
| | 65 | — | — | 0.010 | 0.0340 | — | — | — | — |
| | 66 | — | — | — | — | — | — | — | — |
| | 67 | — | — | — | — | — | — | — | — |
| | 68 | — | — | — | — | — | — | — | — |

TABLE 4

EVALUATION OF CHARACTERISTICS OF FILAMENT

| TYPE | No. | CENTER PEARLITE AREA FRACTION (%) | WIRE DIAMETER AFTER DRAWING (mm) | THICKNESSES OF SURFACE PART (μm) | RATIO BETWEEN LAMELLAR CEMENTITE THICKNESS (%) | OCCURRENCE OF DELAMINATION | TENSILE STRENGTH TS (MPa) | COMPREHENSIVE EVALUATION |
|---|---|---|---|---|---|---|---|---|
| EXAMPLES OF PRESENT INVENTION | 35 | 97 | 0.15 | 2.6 | 73 | ABSENT | 3728 | G |
| | 36 | 98 | 0.18 | 3.2 | 74 | ABSENT | 3836 | G |
| | 37 | 99 | 0.20 | 10.6 | 83 | ABSENT | 3754 | G |
| | 38 | 96 | 0.30 | 20.5 | 89 | ABSENT | 3781 | G |
| | 39 | 98 | 0.35 | 3.5 | 91 | ABSENT | 3824 | G |
| | 40 | 99 | 0.15 | 14.9 | 94 | ABSENT | 3738 | G |
| | 41 | 98 | 0.18 | 7.8 | 84 | ABSENT | 3778 | G |
| | 42 | 97 | 0.20 | 6.5 | 94 | ABSENT | 3735 | G |
| | 43 | 98 | 0.30 | 8.2 | 73 | ABSENT | 3748 | G |
| | 44 | 99 | 0.35 | 9.6 | 73 | ABSENT | 4025 | G |
| | 45 | 96 | 0.15 | 2.3 | 84 | ABSENT | 4018 | G |
| | 46 | 99 | 0.18 | 3.9 | 74 | ABSENT | 4015 | G |
| | 47 | 98 | 0.20 | 4.4 | 71 | ABSENT | 4220 | G |
| | 48 | 99 | 0.30 | 8.6 | 84 | ABSENT | 4225 | G |
| | 49 | 98 | 0.35 | 9.2 | 84 | ABSENT | 4235 | G |
| | 50 | 99 | 0.15 | 5.6 | 73 | ABSENT | 4348 | G |
| | 51 | 99 | 0.18 | 6.7 | 83 | ABSENT | 4325 | G |
| | 52 | 98 | 0.20 | 7.4 | 76 | ABSENT | 4310 | G |
| | 53 | 97 | 0.30 | 8.3 | 83 | ABSENT | 4536 | G |
| | 54 | 98 | 0.35 | 9.1 | 83 | ABSENT | 4555 | G |
| | 55 | 97 | 0.15 | 6.4 | 75 | ABSENT | 4567 | G |
| | 56 | 99 | 0.18 | 3.4 | 83 | ABSENT | 4761 | G |
| | 57 | 98 | 0.20 | 6.6 | 79 | ABSENT | 4803 | G |
| | 58 | 97 | 0.30 | 7.3 | 81 | ABSENT | 4807 | G |
| COMPARATIVE EXAMPLES | 59 | 94 | 0.30 | 9.9 | 73 | ABSENT | 3146 | B |
| | 60 | 98 | 0.18 | 5.1 | 84 | PRESENT | 4793 | B |
| | 61 | 97 | 0.20 | 9.6 | 74 | ABSENT | 3168 | B |
| | 62 | 96 | 0.20 | 10.9 | 71 | PRESENT | 4013 | B |
| | 63 | 96 | 0.23 | 5.4 | 84 | ABSENT | 3154 | B |
| | 64 | 97 | 0.25 | 5.6 | 84 | PRESENT | 4032 | B |
| | 65 | 96 | 0.21 | 10.3 | 73 | PRESENT | 4013 | B |
| | 66 | 98 | 0.18 | 5.3 | 83 | PRESENT | 3903 | B |
| | 67 | 97 | 0.21 | 0.0 | 96 | PRESENT | 3988 | B |
| | 68 | 96 | 0.20 | 21.1 | 69 | ABSENT | 3129 | B |

The invention claimed is:

1. A filament for a high strength steel cord, which has a wire diameter R of 0.1 mm to 0.4 mm, comprising, in a chemical composition, by mass %:
C: 0.70% to 1.20%;
Si: 0.15% to 0.60%;
Mn: 0.10% to 1.00%;
N: 0.0010% to 0.0050%;
Al: more than 0% and 0.0100% or less; and
a remainder of Fe and impurities,
wherein a surface part and a central part are included, the surface part covers the central part,
a thickness of the surface part is 0.01×R to 0.10×R,
the central part includes a pearlite structure in a proportion of 95% to 100% by area %,
a C content of the surface part is 40% to 95% of a C content of the central part, and
a ratio of a thickness of a lamellar cementite at a center of the thickness of the surface part to a thickness of a lamellar cementite in the central part is 95% or less.

2. The filament for a high strength steel cord according to claim 1, further comprising, in the chemical composition, by mass %,
one or two or more of
Ti: more than 0% and 0.1000% or less,
Cr: more than 0% and 0.5000% or less,
Co: more than 0% and 0.5000% or less,
V: more than 0% and 0.5000% or less,
Cu: more than 0% and 0.2000% or less,
Nb: more than 0% and 0.1000% or less,
Mo: more than 0% and 0.2000% or less,
W: more than 0% and 0.200% or less,
B: more than 0% and 0.0030% or less,
REM: more than 0% and 0.0050% or less,
Ca: more than 0.0005% and 0.0050% or less,
Mg: more than 0.0005% and 0.0050% or less, and
Zr: more than 0.0005% and 0.0100% or less.

* * * * *